United States Patent Office 3,655,625
Patented Apr. 11, 1972

3,655,625
POLYURETHANE-CINNAMATE PHOTOPOLYMER
Daniel C. Thomas, Covina, Calif., assignor to Lithoplate, Inc., Covina, Calif.
No Drawing. Filed July 28, 1969, Ser. No. 845,548
Int. Cl. C08g 27/04
U.S. Cl. 260—77.5 AM
5 Claims

ABSTRACT OF THE DISCLOSURE

A blocked polyurethane resin, isocyanate terminated, with isocyanate groups treated with phenol, and then heated to drive off the phenol and reacted with a polyol, is reacted with a cinnamoylating agent to make a polyurethane cinnamate which is a photopolymer.

---

This invention relates to a new photopolymer capable of use in photolithography and photomechanical processes. It also relates to a method for making the photopolymer.

One object of this invention is to provide an inherently light-sensitive photopolymer for use in the graphic arts and particularly in preparing or forming surface-type lithographic plates and etching resists.

It is a further object of this invention to provide a photopolymer which may be applied directly in contact with a metal support member or over such a member having a sublayer thereon.

Yet another object is to provide a photopolymer which may be applied directly to many different types of metal surfaces, such as steel, copper and aluminum, without producing undesirable effects.

A further object of this invention is to provide a photopolymer which is suitable for a variety of uses in lithographic and photomechanical processes, such as in the production of printed circuits, chemical milling and etching processes.

An additional object of this invention is to provide a photopolymer which permits the utilization of an automated process in the preparation of printing plates for use in lithographic operations by being capable of being developed by organic solvents.

A further object is the provision of a photopolymer which may be developed by either organic solvents or emulsion developers.

The present invention comprises a polyurethane-cinnamate made by reacting a polyurethane resin with a cinnamoylating agent such as cinnamoyl chloride in the presence of a solvent and subsequently precipitating the polyurethane-cinnamate from the solvent.

The polyurethane resin used as a preferred starting material in the present invention is a blocked polyurethane prepolymer. This prepolymer was originally developed for formulation of magnet wire enamels, braid lacquers, sleeving varnishes, baking enamels, and so on. It has been used heretofore to produce coatings having superior abrasion resistance, high gloss, outstanding dielectric strength and ozone resistance, exceptional toughness, and low temperature flexibility. These resins are isocyanate-terminated polymers whose isocyanate groups have been treated with phenol to form a thermally unstable linkage and have then been heated to the point where the phenol was driven off, thus enabling the isocyanate groups to react with a previously-added polyol system. The molecular weight of this blocked polyurethane prepolymer is about 8,000.

Other polyurethane resins may be used, including those which are prepared by reacting meta-tolylene-diamine (majority isomer) with phosgene to form meta-tolylene-diisocyanate and hydrogen chloride. Also, phosgene can be reacted with alcohols to form corresponding esters which may then be reacted with amines to produce the equivalent urethanes of the isocyanate method. To obtain polymers, glycols are used to form biesters and triols for branching of hydroxy compounds together with diamines for the final condensation.

Such polyurethane resins may be cinnamoylated by use of any of the presently available cinnamoylating compounds which contain cinnamoyl radicals, such as cinnamic acid, cinnamoyl chloride, and so on.

The polyurethane-cinnamate photopolymer of this invention has unique properties which distinguish from photopolymers previously known. The fact that the preferred polyurethane resin is a blocked isocyanate resin means that when it is cinnamoylated, it forms a blocked isocyanate polyurethane-cinnamate resin which can be easily applied to a support member to form a lithographic plate or a photoresist and can then be cured by heating to unblock the resin. Due to this unusual property, the maximum efficiency in coating operations can be obtained, so that ideal conditions for coating are readily available in the manufacturing plant. The unblocking can take place at any time by heating, whether prior to the coating, following the application of the coating, or prior to exposure and development, or even following exposure and development in the customer's shop. As a result, the blocked isocyanate polyurethane-cinnamate coatings of this invention can be easily handled in the manufacturing of photopolymer coated lithographic plates or photoresist for printed circuits with subsequent exposure and development in the customer's shop.

Another important feature of the photopolymer of this invention is that it retains its abrasion resistance, toughness, chemical resistance, hardness, and flexibility, once it has been heated to unblock the photopolymer. These qualities are very good in providing long-lasting plates.

I know of no solvent which dissolves the unlocked isocyanate polyurethane-cinnamate resin of this invention and therefore recommend that the polymer be dissolved and coated in the blocked state, followed, as said before, at any suitable time by the heating action which forms the very desirable unblocked final polymer.

As an example of a photopolymer embodying the principles of the invention, the polyurethane may be "Tranco 8-A" polyurethane resin. This material is a clear, phenol-blocked, high temperature urethane baking enamel which cures by reaction of isocyanate groups produced under the influence of heat with free hydroxyl groups already present.

Typical properties

Color, Gardner—1-3
Viscosity, Garden-Holt—A-E
Weight percent solids—50, plus or minus 1
Solvent (50/50 by wt.)—Xylene, ethylene glycol monoethyl ether acetate
Weight, lbs. per gallon—8.4

Film application

Spray using conventional or electrostatic equipment. No further reduction is generally needed. Allow to air-dry 15–30 minutes (for best results). Bake 30 minutes at 150° C. (300° F.)

Typical film properties

Sward hardness—60
Flexibility—Pass ⅛ in. bend
Impact resistance—Greater than 100 in. pounds reverse impact
Sand abrasion—Greater than 400 liters/mil
Tensile strength—5000 p.s.i.

Chemical resistance

| | |
|---|---|
| 20% sodium hydroxide | Excellent. |
| 10% hydrochloric acid | Good. |
| 10% nitric acid | Fair-film darkens. |
| Toluene | Excellent. |
| Methyl isobutyl ketone | Do. |
| Ethyl alcohol | Do. |
| Ethyl acetate | Do. |

Typical analysis

Volatiles (unblocking temp)—33%
Blocking agent—Phenol
Available NCO (when unblocked)—12.7% (based on 8A wt.)

Tranco 8A is completely unreactive at room temperature. This permits formulations of Tranco 8A and polyethers, polyesters, castor oil and polyamides that are room temperature stable for several months.

Tranco 8A unblocks at 285° F. At this temperature NCO groups become available for reaction with OH groups from polyethers, polyesters, castor oils, etc. The time of cure at this temperature is approximately 30 minutes. Temperatures may be increased and cure times shortened so that at 500° F. a cure time of less than five minutes will be realized. In the curing facilities provision must be made for carrying off the liberated blocking agent, phenol, which must be removed before Tranco 8A will cure.

As a typical example, 10 grams of the above polyurethane resin and 50 cc. of cyclohexanone may be placed in a beaker and stirred 30 minutes at 60° C. to dissolve the resin. Then 10 grams of cinnamoyl chloride are added and stirred for 15 minutes at 60–95° C. to dissolve the cinnamoyl chloride. The heating of the reaction mixture is continued for one hour at 80–115° C. The polyurethane-cinnamate reaction product is then precipitated and washed in methanol several times to remove cinnamoyl chloride and dried.

This polyurethane-cinnamate photopolymer has been used successfully on ball-grained plates to make a presensitized negative-working lithographic plate that was exposed and developed to give printable images.

The cinnamate polymer of this invention has also been used to make a presensitized negative-working diazo-photopolymer plate by putting a coating of this photopolymer over a negative-working diazo plate. Although the polyurethane cinnamate polymer itself was found to have a photospeed slower than a phenoxy-cinnamate polymer, on emulsion-developed ball-grained plates, the polyurethane cinnamate polymer negative-working diazo-photopolymer plate was found to have a very fast photospeed, about ten times as fast as the diazo resin plate without this photopolymer coating.

The polymer of this invention has, in addition, been used successfully in making positive-working lithographic plates by coating positive-working phytic acid-over-diazo resin plates and naphthalene sulfonic acid-over-diazo resin plates with this photopolymer, to enable more rapid exposures and plates capable of longer press runs.

Still further, photo-resist plates have been made from the polymer of this invention. The cinnamate polymer of polyurethane, prepared as above, was dissolved in a solvent in quantities as follows.

| Ingredient: | Parts by wt. |
|---|---|
| Photopolymer (polyurethane cinnamate) | 10 |
| Cyclohexanone | 100 |
| Michler's ketone | 1 |

The solution was applied to a printed circuit board, the solvent evaporated, and the board dried to remove residual solvent.

The resultant photo-resist plate was exposed to a xenon arc lamp for ten minutes at 1200 foot candles through a negative of a desired printed circuit pattern. The plate was then developed by rocking it in xylene to remove the unexposed areas. The exposed insoluble image was then dried. After drying, it was placed in a 42° Bé. ferric chloride solution and etched to give the desired printed circuit. The lines were clean and sharp.

I claim:
1. A photopolymer product made according to the process which comprises,
   (a) dissolving in a solvent a polyurethane resin having its terminal isocyanate groups blocked, said resin having a molecular weight of about 8000 is a material prepared by treating an isocyanate terminated polymer with phenol,
   (b) heating and reacting the dissolved resin with a cinnamoylating agent to form the photopolymer, and
   (c) precipitating the photopolymer from the solvent.
2. A process for preparing the product of claim 1 which process comprises,
   (a) dissolving in a solvent a polyurethane resin having its terminal isocyanate groups blocked, said resin having a molecular weight of about 8000 is a material prepared by treating an isocyanate terminated polymer with phenol,
   (b) heating and reacting the dissolved resin with a cinnamolyating agent to form the photopolymer, and
   (c) precipitating the photopolymer from the solvent.
3. The product of claim 1 wherein said agent is cinnamoyl chloride.
4. The process of claim 2 wherein the heating step is carried on at about 80 to 115° C.
5. The process of claim 2 wherein the cinnamoylating agent is cinnamoyl chloride.

References Cited
UNITED STATES PATENTS
3,511,814    5/1970    Ogura et al. _____ 260—77.5 AM DONALD E. CZAJA, Primary Examiner M. J. WELSH, Assistant Examiner U.S. Cl. X.R.

96—86, 88, 115; 117—128.4; 260—32.8 N, 77.5 TB, 77.5 AA